United States Patent [19]

O'Brien et al.

[11] 4,363,408
[45] Dec. 14, 1982

[54] WEIGHING AND GRADING SAMPLES IN ORDER TO GRADE LARGE BATCHES OF FRUIT

[75] Inventors: Michael O'Brien; Nelson E. Smith, Jr., both of Davis, Calif.; Stanley E. Prussia, Griffin, Ga.

[73] Assignee: The Regents of The University of California, Berkeley, Calif.

[21] Appl. No.: 223,161

[22] Filed: Jan. 7, 1981

[51] Int. Cl.³ .............................................. B07C 5/00
[52] U.S. Cl. .................................. 209/546; 209/558; 209/593; 414/421; 177/25; 177/210 R
[58] Field of Search ............... 209/546, 558, 592, 593; 414/421; 177/25, 199, 210 R, 210 C, 210 EM, 210 FP, 211

[56] References Cited

U.S. PATENT DOCUMENTS 3,918,587 11/1975 Drew, Jr. ............................ 209/593
4,024,053 5/1977 Drew, Jr. et al. .................. 209/593
4,106,628 8/1978 Warkentin ...................... 209/593 X Primary Examiner—Allen N. Knowles
Attorney, Agent, or Firm—Owen, Wickersham & Erickson

[57] ABSTRACT

Method and apparatus for grading large batches of fruit by sampling technique. A sample, drawn from a batch, is divided into two approximately equal portions, one portion being inspected without being weighed. The other portion is weighed and then inspected. Grade-defect material is placed into separately classified buckets and weighed one by one. Grade-defect percentages are then determined and acceptance and grading thereby determined. A weigh hopper is suspended from a load cell by a pair of wires, one at each side of the weigh hopper. A turnbuckle on each wire enables adjustment, and excessive motion of the weigh hopper is dampened. The load cell is suspended from a shock transmission member which rests on a shock-absorbing spring that is compressed when shock loads are exerted. A cable attached to the center of the upper edge on one end of the weigh hopper passes around the bottom of the weigh hopper and to a cam device, to provide smooth inversion of the weigh hopper and a dwell period at full inversion.

21 Claims, 12 Drawing Figures

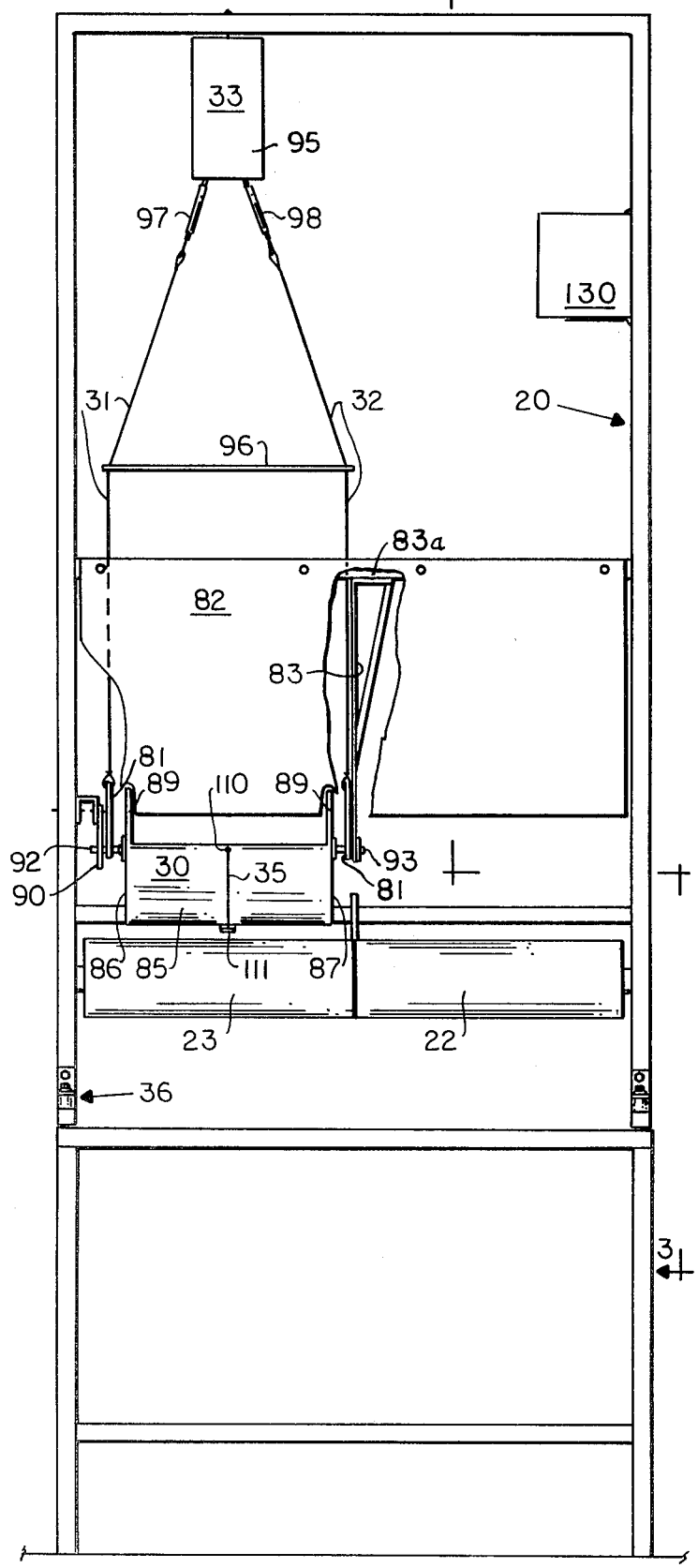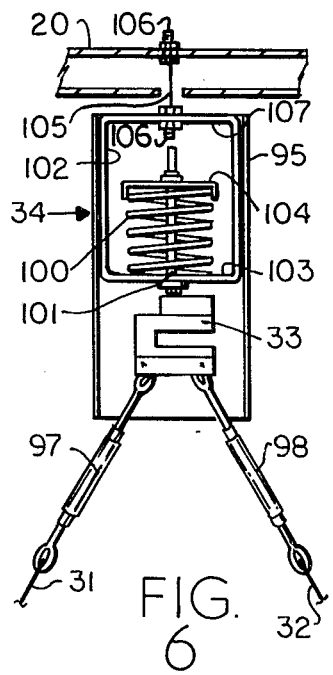

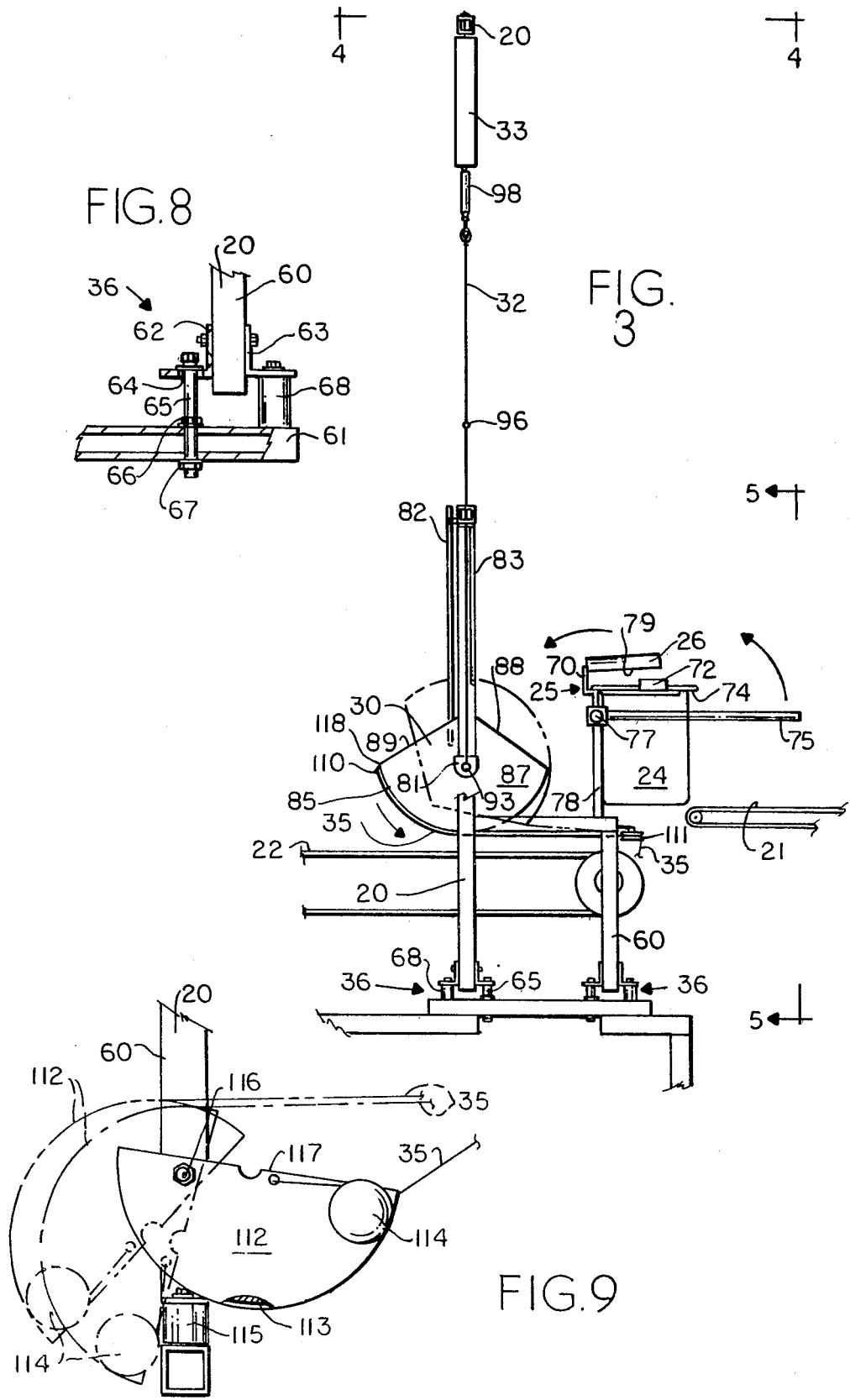

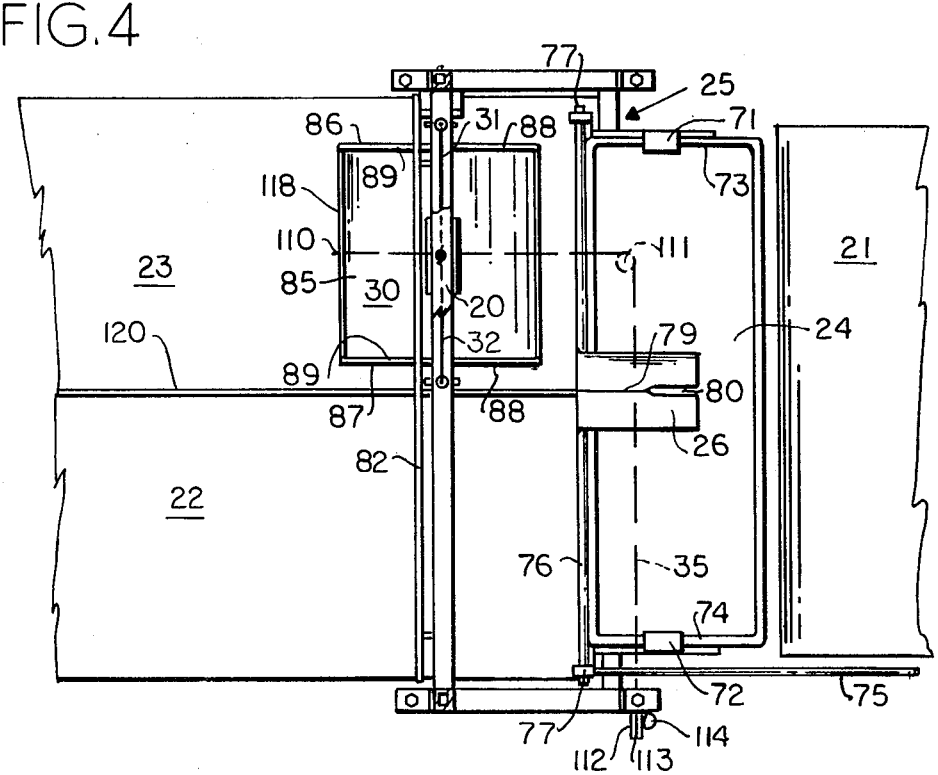
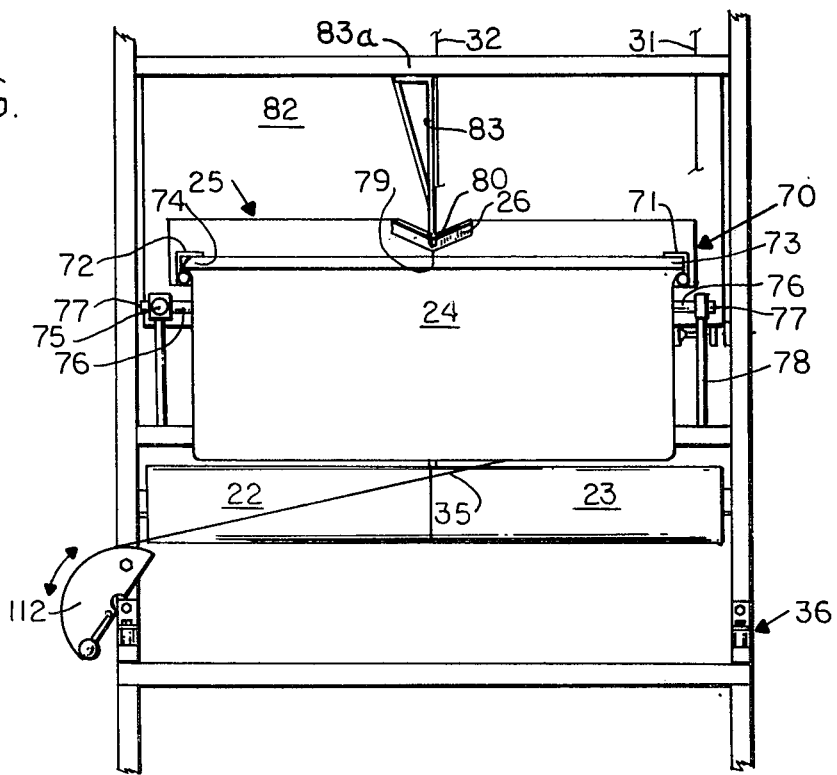

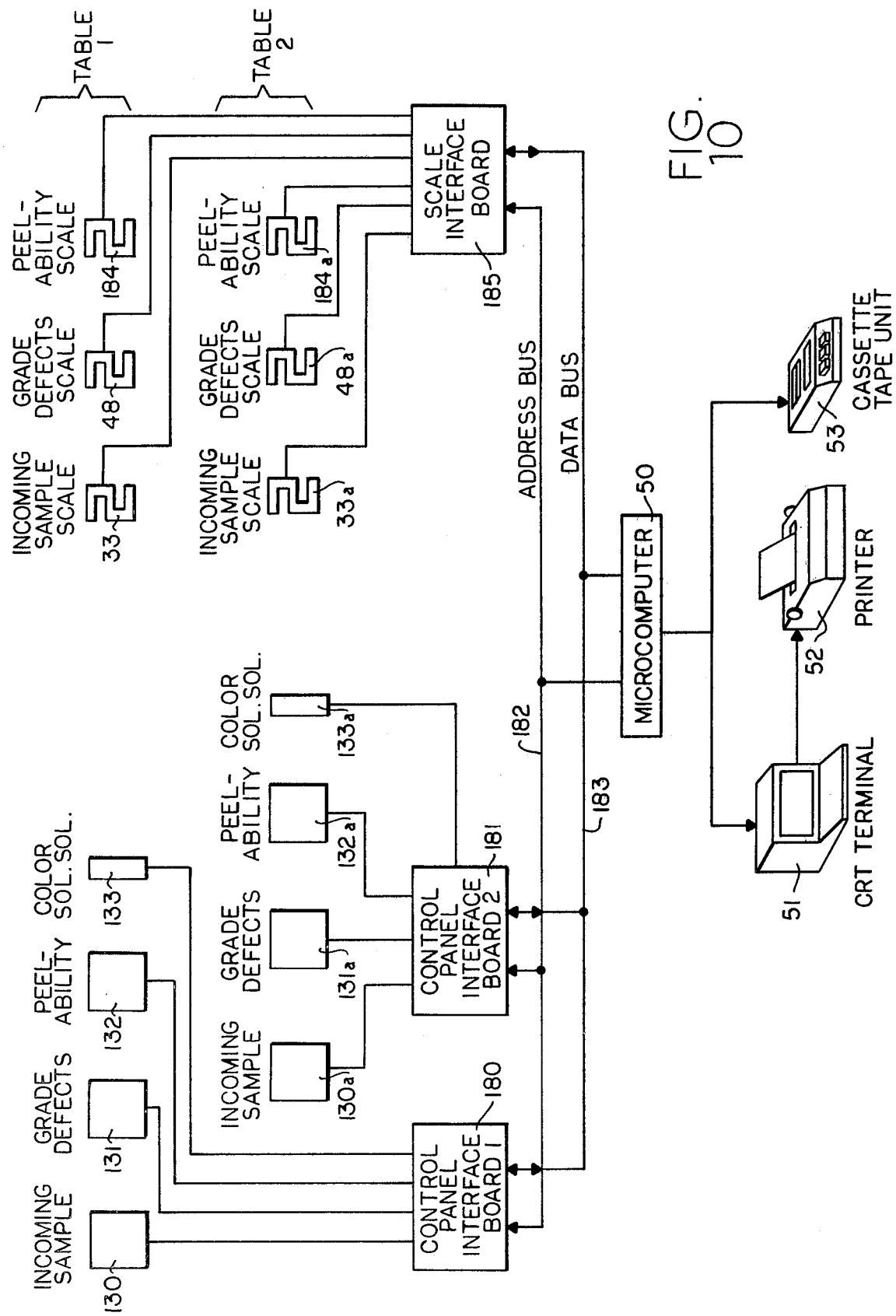

WEIGHING AND GRADING SAMPLES IN ORDER TO GRADE LARGE BATCHES OF FRUIT

This invention relates to method and apparatus for determining from samples the overall grade of a truck-trailer load of fruit or the like.

BACKGROUND OF THE INVENTION

The invention applies to the grading of large batches of various kinds of fruit on the basis of carefully graded samples. It can be used with many kinds of fruits, including drupes, but it will be helpful to use a specific example, and for that purpose the handling of canning tomatoes affords a good basis for description.

Tomatoes grown for canning are mechanically harvested with culling and sorting taking place on the harvester, so that most unsatisfactory fruit is discarded. However, among the selected tomatoes there are often tomatoes which should have been culled but were not, for whatever reason. There may be some tomatoes with worm damage, some with mold, some that are not ripe, and so on. Also, depending on field conditions there may be dirt, trash, leaves, or other materials than tomatoes among the selected tomatoes. Therefore, the harvested tomatoes packed at random into very large trailers pulled by trucks, are taken to an inspection station for grading. The inspection there determines whether the canner will accept or reject each trailer load, and if the load is accepted, it is graded for quality in order to determine how much the grower is to be paid per ton.

The inspection stations are typically open-air, pole-type platforms at a height equal to that of a flat-bed truck trailer, this being the height needed for a bulk-load sampler to deliver fruit to the grading tables. The value of the annual tomato crop currently brought to such inspection and grading stations is approximately $380,000,000. The percent of off-grade fruit in a load is deducted from the payment the grower receives from the processor. The best loads of tomatoes are normally canned as whole tomatoes, while lower grades may be used for tomato sauce, ketchup, and the like.

Since each truck trailer holds several tons of fruit, it is not practical to inspect every tomato individually at the inspection station, though they may be handled individually at the cannery. Therefore, samples are employed, usually four samples per load, one sample being taken from the center of the trailer, and additional samples being taken from near its corners. The sampler itself may be that shown in the O'Brien et al. U.S. Pat. No. 3,683,702 which issued on Aug. 15, 1972. Each sample of about fifty pounds is then divided into two approximately equal portions, one portion being checked for certain types of defects and the other portion for different characteristics, such as peelability and soluble solids.

The present invention is concerned with an overall grading system and also with checking a sample for certain grade defects, including worm damage, unripeness, mold, dirt and trash, and miscellaneous defects that may relegate the load to limited use at the cannery.

The sample is taken on the basis of volume, using the sampler described in U.S. Pat. No. 3,683,702 in conjunction with normal spillover processes. Each such sample has a nominal weight, but that weight is only approximate and the approximate weights vary so much that the results of assuming that the sample weighs a particular amount leads to consequential inaccuracies that may be unfair or even disastrous, either to the grower or to the canner.

For example, a nominally "hundred pound" sample, when taken on the basis of volume, may typically vary from a low of about eighty-eight pounds to a high of about one hundred twelve pounds. When the "grade defect" materials are weighed, their actual weight has heretofore been compared with the sample as though the sample weighed exactly one hundred pounds. However, if the sample happened to be small, say weighing only eighty-eight pounds, the canner might have been misled into accepting a batch of fruit that should have been rejected or grading it too high; contrariwise, if the sample happened to weigh one hundred twelve pounds, the chances of grade defect products exceeding the tolerable weight limit were greater, so that the grower might have been paid much less than he deserved or might have had the entire batch rejected, simply because the true weight of the sample was not known and was assumed to be exactly one hundred pounds.

Thus, it is important to weigh each such sample accurately before comparing it with the weight of the grade-defect portions.

The invention therefore provides a weighing system between the bulk load sampler and the grading table. A rugged, yet accurate, weighing system is necessary, one that can be accurate despite water spray, dust, tomato vines, wind, temperature extremes, multiple operators, and large broadband vibrational forces on the inspection platform. In such environments, it appears that the best results can be obtained from scales incorporating a weigh hopper suspended from a direct-weighing overhead electronic load cell. Simplicity, low maintenance, isolation from contamination, and relatively low cost are some of the factors that favor such a system at inspection stations for processing tomatoes.

A disadvantage of direct-weighing load cells in the stated environment is that traditional manners of use do not protect them adequately from shock loads. Scales with naturally large displacements or traditional lever arrangements typically use dashpots to provide shock load protection. The extremely small displacement of direct-weighing electronic load cells prevent the generation of sufficient damping force by a dashpot. To give load cells solid support, as employed by scales like chemistry balances where critical components are loaded only while weighing, might seem to offer a satisfactory solution, but test at tomato inspection stations showed that such systems were too complicated and required too many operator steps in the weighing cycle.

Other important considerations for tomato weighing systems are the need for damage-free handling and for obtaining even distribution of the fruit in the weigh hopper, since asymmetrical loading causes lateral forces that can lower system accuracy through vertical frictional forces.

It is desirable to provide a system that can employ the conventional sample box to transport the sample from the bulk load sampler to the mechanical grading table. At some inspection stations, the space available for the weighing system is nearly as small as the sample box. Moreover, the system should permit either front or side entry of the sample box. Current inspection systems also prefer to continue the procedure of dividing each sample of fruit substantially equally for two distinct types of inspection, scales being used to weigh the half that is graded for defects while weighing is unnecessary for the other half.

An overall consideration is the need for simplicity of design and operation and for employing a minimum number of components in order to assure reliability and low cost. The system's accuracy must, of course, meet or exceed applicable State regulations, and must consider the operators' safety, capabilities, and motivations. The operating rate should be rapid, preferably consuming no more than two minutes per four-sample load. The system needs to be durable and accurate for 40,000 cycles per season for at least five seasons. It should also result in minimum damage to the fruit. The equipment should be easy to manufacture, install, maintain, and clean. There should be no complicated lifting or dumping devices. Finally, the peak shock loads on the load cell should not exceed twice the sample weight.

The objects of the present invention include solving the problems set forth above and meeting the requirements and considerations stated there.

In addition, the invention has the objects of: providing for suitable sample dumping of the sample box while sending approximately half of the contents of the sample box into the weigh hopper and half onto a conveyor for the sample portion that does not need to be weighed; suspending the overhead load cell in an improved manner; protecting the load cell from shock; providing adjustment for the suspension lines by which the weigh hopper is suspended from the load cell; providing the weigh hopper suspension with dampening to limit swing and accelerate the actual weighing while substantially eliminating the friction occasioned by the dampening; providing for smooth and gentle but effective release of the fruit from the weigh hopper to a conveyor close below it; providing a simple but rapid and effective system for determining the grade defect percentages for each sample; providing clear instructions for the operators at each stage; and producing complete and clear information about each important factor.

Other objects and advantages of the invention will appear from the following description.

SUMMARY OF THE INVENTION

The invention comprises a method and apparatus for grading large batches of fruit by sampling technique. After withdrawing a sample from the large batch of fruit and placing the fruit in a flanged sample box or bin, the flanged bin is inserted into a dumping frame and dumped in such a way that half of the contents goes into a scale-supported weigh hopper and half into a first conveyor. The material in the first conveyor is handled in a conventional manner not concerned directly with the present invention except as to coordination and to the use of the computer system therewith.

In this invention, the fruit in the weigh hopper is weighed, and the batch number and actual weight are sent to a microcomputer. Then, the fruit is gently transferred from the weigh hopper to a second conveyor. The path of the fruit in the second conveyor is split into two sorting conveyor paths. The fruit in each path is inspected, and the grade-defect material is placed into separately classified grade-defect buckets. After all the fruit from the weigh hopper has been inspected, each grade-defect bucket is weighed one by one and the weights sent to the microcomputer.

The grade defect percentages by weight are determined by the microcomputer and displayed so that a supervisor can determine whether to accept, reject, or take another check sample, according to the figures displayed. After his decision, the final choice and grade of the fruit are indicated to enable decision as to whether and how to process it.

The weighing machine has a main frame supported by vibration dampening means. A piano wire is suspended from an upper portion of the main frame, and a rectangular housing is rigidly attached to and suspended from the piano wire. The lower end of a shock-absorbing spring rests on a portion of the housing, while a shock transmission member rests on the upper end of the spring and extends down through the spring and the lower end of the housing. The load cell is suspended from this shock transmission member, and the weigh hopper is suspended from the load cell by a pair of wires attached to bearings, One bearing and one wire at each side of the weigh hopper. A turnbuckle on each wire enables adjustment of the suspension of the weigh hopper from the load cell. Between the weigh hopper and the main frame are dampening means for preventing excessive motion of the weigh hopper relative to the frame, and also preventing transmission of weight from the weigh hopper to the frame.

The transfer means for dumping the contents of the weigh hopper gently onto a conveyor comprises a cable attached to the center of the upper edge on one end of the arcuate-bottomed weigh hopper and passing around the bottom of the weigh hopper and thence to a cam device. The cam device enables smooth inversion of the weigh hopper and automatically provides a dwell period therefor at the full inversion point thereof.

Controls, panels, interfaces, and a microcomputer add efficiency to the system by providing communcation between the computer and the operators. They indicate to the operaters the order for the various steps and the time to perform them, and they inform the microcomputer when each step was taken as well as necessary values that are found.

BRIEF DESCRIPTION OF THE DRAWINGS

FIG. 2 is a view in front elevation of the sample weighing portion of the device and associated apparatus.

FIG. 3 is a fragmentary view in side elevation of the same, with some parts omitted.

FIG. 4 is a fragmentary top plan view of the device of FIG. 2, with some parts broken away.

FIG. 5 is a fragmentary view in rear elevation of the lower portion of FIG. 4.

FIG. 6 is an enlarged fragmentary view in elevation of the suspension of the load cell and of the adjusting turn buckles, the cover normally protecting the load cell and the shock-damping apparatus removed.

FIG. 7 is a fragmentary view in elevation and in section of the damping suspension at one side of the weigh hopper.

FIG. 8 is a fragmentary view of a bottom portion of the main frame for the weighing apparatus, showing the vibration isolation components.

FIG. 9 is a fragmentary view in elevation, partially broken away, of a portion of the weigh hopper dumping cam showing three positions thereof and illustrating the dwell portion of the dumping cycle.

FIG. 10 is a diagram of the control and data acquisition system for the grading system.

DESCRIPTION OF A PREFERRED EMBODIMENT

Figure 1:
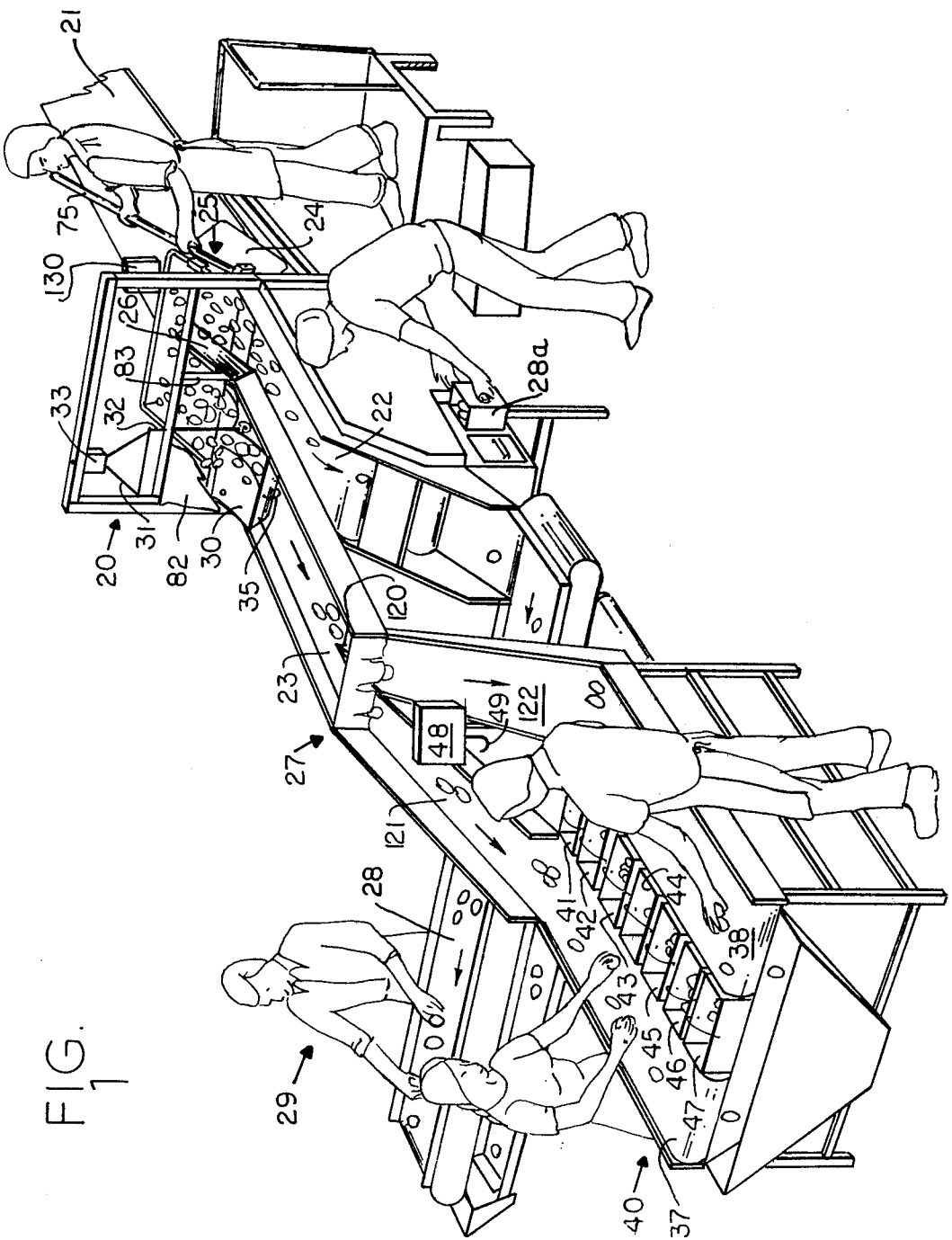
FIG. 1 is a view in perspective of a system for grading harvested fruit according to the principles of the invention; a protective flexible curtain near the weigh hopper is broken off in order to show parts that would otherwise be concealed.

Brief overall description (see FIG. 1 mainly)

A support frame 20 supports and positions all the elements needed for the weighing system. The frame 20 is sized to fit over an input conveyor belt 21 and output conveyor belts 22 and 23 at the inlet end of a mechanical grading table assembly 27. The lead-in conveyor 21 may be used to convey a sample box 24 to the table assembly 27. A traditional sample box or bin 24 can be placed into a sample box dumper 25 which accepts the box 24 and inverts it. A divider 26 in the center of the dumper 25 directs approximately half of the fruit to the belt 22 and half to a weigh hopper 30. Fruit to be graded for peelability, color and soluble solids measurements lands directly on the conveyor belt 22. Some fruit is routed to a sample drawer 28a for color measurement and for ascertaining soluble solids content, and the remainder goes to a conveyor 28 that carries it on to a peelability inspection station 29. Fruit for grade-defect determination enters the arcuate weigh hopper 30. The hopper 30 is supported by cables 31 and 32 from an overhead electronic load cell 33. A shock protection assembly 34 (See FIG. 6) isolates the load cell 33 from the impact caused by the fruit falling into the weigh hopper 30 from the box 24. An electronic control panel 130 (FIGS. 10 and 11) is attached to the support frame 20 at a location convenient to the operator who starts the weighing. After each weight is taken, the operator pulls a cable 35 (see FIGS. 4 and 5) to empty the hopper 30. The entire support frame 20 is mounted on a vibration isolator assembly 36 (FIG. 8) to increase the accuracy of the scales. The mass of the frame 20 helps in this respect by its inertial resistance to force caused by shock or vibration.

Figure 12:
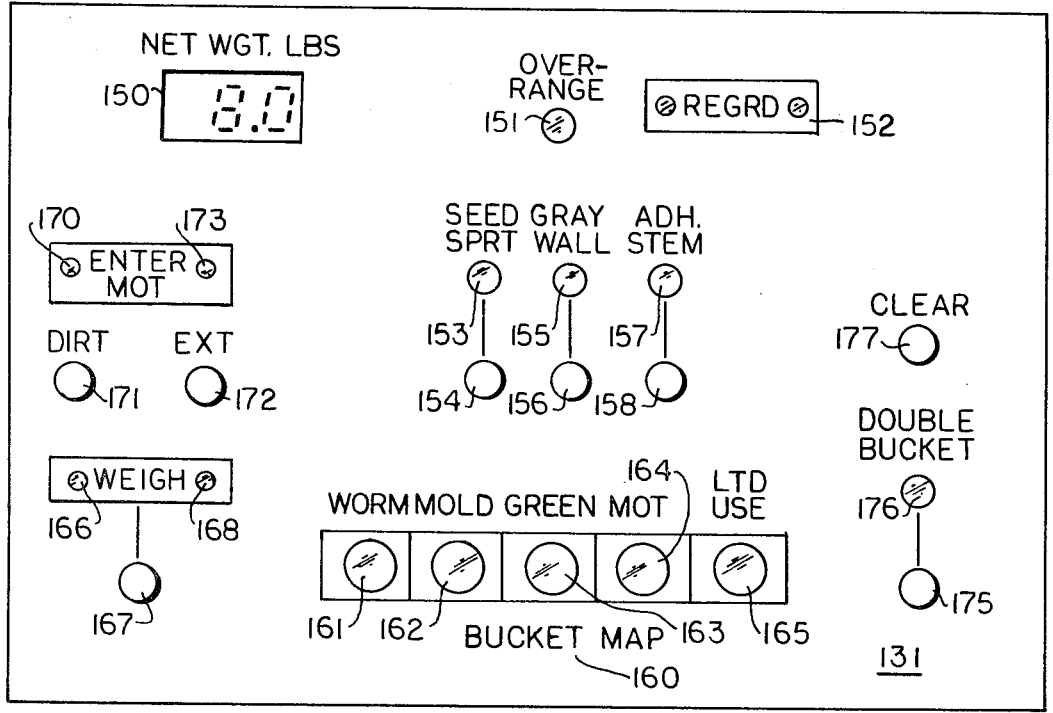
FIG. 12 is a view in front elevation of the grade defect panel.

After its portion of the sample has been weighed, the weigh hopper 30 gently releases its contents onto the conveyor 23, from which that sample may be split into two streams that go to conveyors 37 and 38, one stream going to each side of a grading table 40. At the table 40, workers stand beside the conveyors 37 and 38 and place grade-defect material into separate buckets 41, 42, 43, 44, 45, 46, and 47, one for each type of grade-defect. These buckets 41, 42, 43, 44, 45, 46, and 47 are normally color-coded to enable the inspectors to classify the material quickly. Adjacent to the grading table 40 is another weighing device 48, also comprising a load cell, from which is suspended a hook 49 on which each of the grade-defect buckets 41, 42, 43, 44, 45, 46, and 47 may, in turn, be placed one at a time. There is also a grade-defect control panel 131 (FIGS. 10 and 12).

A microcomputer 50 (see FIG. 10) is provided automatically with the weight of the sample as a whole and of the separate weight of each grade-defect bucket. A display terminal 51 enables a controller to evaluate the results and to determine whether they are ready to be printed by a printer 52. The data also goes into a cassette tape unit 53 to make a permanent record. The inspected good fruit is returned to the trailer and the defective fruit is thrown away.

Support of the main frame 20 (FIG. 8)

The main frame 20 is vibrationally isolated from other framework of the station by the assembly 36. As shown in FIG. 8, each leg 60 of the main frame 20 is mounted on connecting framework 61 by special connection arrangements. Thus, angle brackets 62 and 63 are secured to the leg 60, as by a bolt passing through a vertical slot to enable vertical adjustment. The bracket 62 has an oversize opening 64 through which extends a bolt 65 which is a guide and limit stop and overload protector member. Nuts 66 and 67 make a tight securement to the member 61, while the head of the bolt 65 and its adjacent shank enable relative movement of the member 61 in the oversize opening 64 without resultant movement of the leg 60. The bracket 63 holds a rubber vibration dampener 68 in place between the bracket 63 and the member 61, which is protected from overload by the bolt 65. The mass of the support frame 20 and the vibration isolation reduce vibrations and thereby increase weighing sensitivity.

Sample box dumper (FIGS. 3-5)

The sample box dumper 25 has a frame with two channel guide members 71 and 72 (see FIGS. 4 and 5) to receive side flanges 73 and 74 of the sample bin or box 24. The sample box dumper 25 may be essentially the same for both side and front entry sample boxes 24, the latter only being shown here, the side-entry type differing only in the location of the flanged box holding channels and the shape and location of a dumping handle 75.

As will be noted from FIG. 4, the sample bin 24 is much wider than the weigh hopper 30, since it is intended that only half of the sample go into the weigh hopper 30, the other half being dumped onto the conveyor 22. Therefore, an integral part of the dumper 25 is the fruit divider 26 that is positioned above the middle of the sample box 24. As the sample box 24 and divider 26 are inverted, half of the fruit is directed to the conveyor 22 and half to the weigh hopper 30. Proper shape of the divider 26 helps to assure uniform fruit distribution inside the hopper 30.

The dumper 25 is supported by the main frame 20 and its handle 75 is attached to a rod 76 at its front end, which, in turn, is rigidly attached to the frame 70 of the dumper 25. An important aspect of the device is the location of the pivots 77 for dumper rotation. Properly selected pivot points assure sufficient height for dumping, uniform fruit distribution in the hopper, minimum torque for rotation, and clearance of the hopper support cables.

Support portions 78 (FIG. 3) connected to the main frame 20 support the rod 76, and when the handle 75 is moved, the dumper 25 is rotated relatively to the main frame 20, and the bin 24 is thereby inverted. The divider 26 comprises a v-shaped bar, which normally appears as shown in FIG. 5, but when the dumper 25 is inverted, the bar 26 is, of course, upside down and the fruit flows out on one side or the other of the vertex 79, either into the weigh hopper 30 or onto the conveyor 22. The V-shaped bar 26 has a notch 80 at its outboard end to enable it to go around a frame member 83 and the cable 32.

The divider 26 also shields one of the hopper axles and the hopper's bearing support 81 from the contents of the sample box 24. A flexible curtain 82 over the hopper 30 prevents occasional overshoot of fruit. A solid bar 83a on the main frame 20 provides a stop for the rotating dumper 25. Engagement of the dumper 25 with the stop 83a helps assure that the sample box 24 is completely emptied.

Suspension of the weigh hopper

The weigh hopper 30 is preferably shaped as a circular cylindrical segment 85 with vertical planar sides 86 and 87 having sloping upper edges 88 and 89, (FIG. 3) to define a volume appropriate to the sample.

The weigh hopper 30 may be made from 18 gauge stainless steel sheet metal. It is carefully dimensioned to hold the designed size of sample of tomatoes (or other fruit) while fitting between the side walls of the conveyor 23. Locating the hopper 30 inside the conveyor walls enables the lowest possible height thereabove for the sample dumper 25 and minimizes fruit damage. As shown in FIG. 7, axle guides 90 secured to the frame 20 provide clearance and limit movement of the hopper 30 due to wind or to uneven filling. Friction is minimized by using Teflon for a stepped bearing 91 with a collar 92 around each axle 93 for the hopper 30, the collar 92 lies between the members 81 and 90, and limits lateral movement of the hopper 30 within a clearance space, while the bearing 91 limits its fore and aft movement.

The axles 93 extend out from the weigh hopper 30 into a slot 94 of the axle guides 90, which are attached to the main frame 20. The slot 94 is purposely oversized relative to the axles 93, and the weigh hopper 30 is not intended ever to rest on the bottom of the slot 94. Instead, it is suspended somewhere between the top and the bottom and between the two sides of the slots 94. As soon as movement quiets down, there will be no weight whatever transmitted to the main frame 20, so that the entire weight is supported by the wires 31 and 32 and therefore by the load cell 33.

The weigh hopper 30 is supported on each side by the wire or cable 31, 32 attached to the vertical bearing bars 81. The wires 31 and 32 extend up into a load cell housing 95 seen in FIG. 2. The housing 95 is preferably water tight and protects the load cell 33. A spacer rod 96 keeps the cables 31 and 32 parallel to the two sides 86 and 87 of the weigh hopper 30 up to the height of the rod 96, and from that point on the two wires 31 and 32 converge toward the load cell 33. Each wire 31 and 32 has a suspension turnbuckle 97 or 98 between the rod 96 and the wire's attachment to the load cell 33, as shown in FIG. 6. The turnbuckles 97 and 98 enable adjustment of the weigh hopper 30 so that it can be positively set in a perfectly level position in the installation, each turnbuckle 97, 98 operating separately to achieve the desired adjustment.

Thus the weigh hopper 30 is suspended only by the wires 31 and 32 and is damped and limited in its movement by the suspension shown in FIG. 7.

Shock protection assembly and load cell suspension

The shock protection assembly 34 device is mounted between the support frame 20 and the electronic load cell 33. Its purpose is to limit the maximum loads on the load cell 33 to about twice the weight expected in the hopper 30. This enables one to use a smaller load cell 33, with only occasional overloads that are within limits specified by the manufacturer.

The shock protection assembly 34 comprises a compression spring 100 preloaded to a force slightly greater than the maximum sample weight expected. This assures that the load cell 33 has firm contact when weights are read; a lack of solid support would cause loss of accuracy due to inertial forces from oscillations. Shock loads due to the dumping of fruit from the sample box 25 into the hopper 30 can cause temporary deflection of the preloaded spring 100. Travel may be limited to approximately 1.0 cm by the supports 90 under the hopper axles 93. The shock protection device 34 is enclosed within the metal case 95 to provide protection from water spray, dust, and so on.

The load cell 33 is preferably attached by a bolt member 101 to the shock preventing spring 100, as shown in FIG. 6. The bolt 101 is attached to the top of the load cell 33 and extends up through a clearance hole in a rectangular housing 102, within which is the coil spring 100 that rests on the bottom bar 103 of the frame member 102. At its upper end, the bolt 101 is secured to a spring plate 104 that bears on the spring 100. The spring 100 is stiff and is ordinarily compressed only slightly; however, if sudden weight or shock is applied on the hopper 30, instead of this shock damaging the load cell 33, the shock is transmitted to compress the spring 100, which, as soon as the shock is over, the force on the load cell 33 returns to the static load imparted by the hopper 30.

The stiff housing 102, which may be of metal bar stock, is itself suspended from the main frame 20 by a short length of piano wire 105 which is attached to and extends through a suitable hollow bolt 106 at the top of the frame 20 and is secured to an upper horizontal portion 107 of the load cell frame member 102. This gives a very free suspension, so that the load cell 33 is not hampered by any faulty misalignment.

The spring 100 is preloaded to a force slightly greater than the maximum expected weight. A shock load greater than the preload causes enough spring deflection to absorb the shock. A positive stop prevents excessive travel.

Thus, when a sample comes to the weighing station, as shown in FIG. 3, an operator rotates the handle 75 to invert the sample bin 24, dumping about half the contents into the weigh hopper 30 and half onto the conveyor 22. The half that is dumped into the weigh hopper 30 is precisely weighed by the load cell 33, and a signal therefrom is sent to a microcomputer 50, as will be explained below. This gives the actual weight of the sample with which weight defects are to be compared.

Transferring fruit from the weigh hopper 30 to the conveyor 23

The sample having been weighed, it is then time to transfer the precisely weighed sample onto its conveyor 23 to go to the defect grading table 40. For this purpose the cable 35 is attached to a point 110 at the center of the upper edge on one end of the weigh hopper 30, the cable 35 going under the cylindrical portion 85 of the weigh hopper 30 and conforming to its circular shape and then extending out tangent to the portion 85 to a pulley 111. From there (see FIGS. 4 and 5) the cable 35 is routed to one side of the frame 20, where a cam 112 is provided. This cam 112 (FIG. 9) comprises a generally semi-circular member with a channel 113 in the arcuate edge and a handle 114 for rotating the cam 112. Cooperating with the handle 114 is a bumper 115 on the frame 20. The cam 112 is pivoted to the frame 20 on a pin 116 on the side opposite the handle 114. In FIG. 9 it will be seen that the cam 112 is normally in a position where its diametral edge 117 is approximately level, but as the cam 112 is rotated by hand, the cable 35 is carried along with it, following in the semi-circular arcuate channel 113.

Due to the shape of the hopper 30 and the shape of the cam 112 taken together, gradual rotation of the weigh hopper 30 causes the hopper 30 to rotate out from under the fruit and releases the tomatoes onto the conveyor 23 without damaging them, while keeping the lower edge 118 of the hopper 30 close to the conveyor 23. Actual rotation of the weigh hopper 30 reaches a full-dumping position before the cam 112 reaches the bumper 115, at the second position of the cam 112 shown in FIG. 9 with the handle 114 still far away from the bumper 115. This means that when the cam 112 rotates over to where the handle 114 engages the bumper 115 and is then moved back, a dwell period is provided so that the weigh hopper 30 stays relatively motionless in its dumping position for a definite period of time, all this being automatically provided by the cam operation and by the shapes of the cam 112 and the weigh hopper 30. This delay prevents the hopper 30 from scooping fruit back up on its return.

The tomatoes, therefore, are not damaged by their gentle transfer from the weigh hopper 30 to the conveyor 23.

Defect grading

As stated above, the tomatoes next go along the conveyor 23 to a stream divider 120 (FIG. 1) which divides them into two streams, so that they move gently down sloped paths 121 and 122 onto the conveyors 37 and 38. This division enables more graders to work in a relatively small space. The conveyors 37 and 38 move along on opposite sides of the grading table 40, where there are grade-defect buckets 41, 42, 43, 44, 45, 46, and 47 of whatever number is suitable, typically seven, although more or fewer may be used if desired. Each bucket 41, 42, 43, 44, 45, and 46 is color coded to its defect so that there may be a red box for one defect, a blue one for another, a white for another, a yellow one for a fourth, and so on. The bucket 47 may be used as a second bucket for any of the grade defects. These enable the graders to sort more quickly and accurately. Thus as the tomatoes move slowly past the graders, they inspect them thoroughly. If worm damage is found in a tomato, that tomato may be placed in the bucket 41. If mold is found on some of the tomatoes, the moldy tomatoes are placed in the grade-defect bucket 42; similarly, green tomatoes are placed in the bucket 43. There are two types of material other than tomatoes: dirt is placed in the bucket 44, while leaves, stems, trash and other typs of foreign matter are placed in the bucket 45. "Limited use" defects are placed in the bucket 46, whether they are tomatoes with sunburn, sun scald, or whatever.

After each particular batch has been processed in this manner, each grade-defect bucket 41, 42, 43, 44, 45, and 46 is separately attached to the hook 49 for the grade-defect load cell 48 in a particular order, as signaled to the panel 131 by the microcomputer 50. The load cell 48 transmits the weigh information to the computer 50. The load cell 48 has a shock prevention spring 100 similar to that shown in FIG. 6, but there need not be a piano wire suspension.

The electronic system (FIG. 10)

The electronic system is set up to convey to the control operator a display which shows the defects, but instead of or in addition to showing them in pounds, computes the weight percentage. Since each defect is compared in weight with the weight of the sample, and since the sample has been accurately weighed, and not simply guessed at, this simple computation gives accurate results for the sample. This display is then checked with the operator. If any sample of a load definitely exceeds the grade-defect amount allowable, then the entire trailer load is rejected. If the defects are definitely below values which are selected as being well below the reject figure, then the load is definitely accepted, the load being graded according to the defect percentages. If on the other hand the sample is in a doubtful category, another sample is taken and the same process gone through. The weight of the defects determines the grade of the fruit, so that the canner can tell where the truck load should go.

Only after the doubtful parts have been determined, if necessary by a re-grading or are found not to be needed, does the control operator feed that information into the printer 52. This printer 52 is also connected to print the same figures at a canning control station, which may be at the cannery, which then sends back information to be given to the truck driver telling him exactly where to take that particular batch. The locations may be in the same plant or they may be even at different plants, depending on the kind of product to be made.

All the information is also retained on the cassete tape unit 53 so that it can be retraced and everything found.

The display and recording system (FIG. 10)

FIG. 10, a block diagram of the tomato grading data acquisition system, shows four major types of components: (1) control panels and control panel interface boards, (2) scales and scale interface boards, (3) the microcomputer 50, and (4) the CRT terminal 51, the printer 52, and the cassette tape unit 53. FIG. 10 also illustrates the fact that a single microcomputer and following elements may be used with two grading tables, each like the FIG. 1 device, to speed up the grading process.

Control panels and control panel interface boards

Control panels provide the primary means of communication between the microcomputer 50 and the graders during the grading operation. At each table there is an incoming sample panel 130 or 130a, a grade-defect panel 131 or 131a, a peelability panel 132 or 132a, and a color and soluble solids panel 133 or 133a. Each panel has several light-emitting diodes (LED's) operated by the microcomputer 50 to indicate to the operator the next operation to be performed; each panel also has pushbutton switches by which the operator signals the completion of the operation and enters data. In addition, the panels 130 and 133 contain switch registers for entering numeric data, and the grade defect panel 131 and peelability panel 132 have numeric displays which indicate the net weight placed on each of their respective scales.

Figure 11:
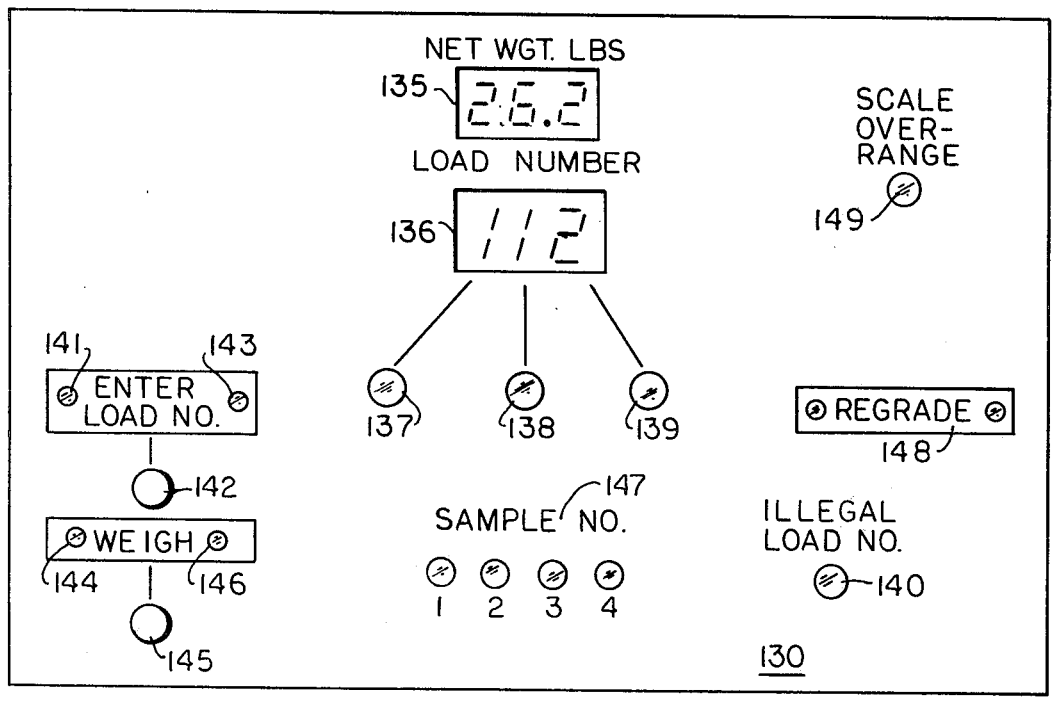
FIG. 11 is a view in front elevation of the sample control panel.

Details of the incoming sample control panels 130 and the grade-defects panel are shown in FIGS. 11 and 12, respectively.

The incoming sample control panel 130 (FIG. 11)

The panel 130 is mounted on the support frame 20. At the top of the incoming sample control panel 130 is a weight display 135 and below that a load number indicator 136, which the operator operates by dials 137, 138, and 139, one for each digit. If he makes a mistake on the load number, duplicating a former load number or going out of order, a light 140 labled "Illegal Load No." is lighted by the microcomputer 50, and the operator can make the needed correction.

Light emitting diodes (Led's) 141 and 143 tell the operator to enter the load number of the next load to be graded. He dials the number into the display 136 by turning the knobs 137, 138, and 139. When the display 136 shows the correct number, he presses a button 142 while the weighing hopper 30 is still empty. The LED's 141 and 143 go out, and a tare weight is then taken on the empty hopper 30. After this has taken place, LED's 144 and 146 come on to tell the operator to weigh a sample. In addition, the No. 1 light in a display 147 is lit, to signify that it is the first sample. The operator then dumps the fruit into the hopper 30 and presses a button 145. The LED's 144 and 146 go out forthwith, and the weight is taken. Then the LEd's 144 and 146 come on again along with NO. 2 in the display 147. All four samples are weighed in this manner. When the fourth sample has been weighed, the LED's 141 and 143 come on again to enable the operator to begin weighing the next load. If the sample is a regraded one, that is indicated by the "Regrade" light 148. When the weight is off scale, a scale overrange light 149 is lighted.

The grade-defects panel 131 (FIG. 12)

The grade-defects panel 131 (FIG. 12) has a weight display 150 at the top, along with an "Overrange" light 151 for loads over the grade-defect scale's capacity and "Regrade" lights 152. Certain defects such as "seed sprouts," "gray wall," and "adherent stems" are not weighed, but if found are to be noted; thus, for each of these there is a light and a button. If at any time during the grading operation one or more of these defects is found, the grader presses the button corresponding to the defect (button 154 for "seed sprouts," button 156 for "gray wall" or button 158 for "adherent stems"), and the light 153, 155, or 157 above the button will light. A "Clear" button, 177, will extinguish all of these lights in case they were pressed by mistake.

When grading is to begin, LED's 170 and 173 are lit to ask the grader to enter the dominant MOT (Material Other than Tomatoes) type. This will be either dirt or extraneous material (stems, leaves, etc.). The operator presses either button 171 or 172 to indicate the MOT type. The LED's 170 and 173 are extinguished and a tare is taken on the empty weighing hook 49. Then LED's 166 and 168 are lit, along with an LED 161 which tells the operator to hang the bucket 41 containing worm-damaged tomatoes on the hook 49. The squares surrounding the lights in a "Bucket map" 160 are color-coded to match the defect buckets 41, 42, 43, 44, 45, 46, and 47. When the worm bucket 41 is on the hook 49, a button 167 is pressed. LED's 166 and 168 then go out, and the bucket 41 is weighed. Then LED's 166 and 168 are lit again, along with an LED 162 to signify that the worm bucket 41 should be removed from the weighing hook 49 and the mold bucket 42 should be hung there instead. This process is repeated for the bucket map 160 LED's 163, 164, and 165 as each corresponding bucket 43, 44, 45 is weighed. If there is too much defective fruit in a given category to fit into a single bucket, a second bucket 47 may be used. Then when the time comes to weight that category, both buckets are hung on the hook 44 and a button 175 is pressed, causing an LED 176 to light and indicate that two buckets are on the scale. When a weigh button 167 is pressed, the bucket tare will be subtracted twice to allow a correct net weight to be determined.

The operation at the panels 132 and 133 is analogous to that described for the panel 131 and need not be described here.

The control and interface boards 180 and 181 (FIG. 10)

The control panel interface boards 180 and 181 which are located in the central control unit, enable the microcomputer 50 to communicate with the control panels 130, 131, 132, 133 etc., there being a control panel interface board (CPIB) 180 or 181 for each table. When the microcomputer 50 turns on a control panel LED or writes data to one of the numeric displays, it sends the appropriate data to the CPIB 180 or 181 via a standard memory write command and address bus 182. The CPIB decodes the data word and causes the required action to take place at the proper control panel. Similarly, when the microcomputer 50 reads the data from the pushbuttons or switch registers, it performs a memory read operation and the CPIB 180 or 181 places the required information on the computer's data bus 183.

The scales and the scale interface board (FIG. 10)

Each of the three electronic scales or load cells—the load cells 34 and 48 and a load cell 184 for the peelability test—for the first table is connected to the microcomputer 50, and so are the three scales 33a, 48a, 184a for the second table. The output of the load cells is a small (0.0004 volts/lb) differential voltage which is proportional to the weight supported by the cell. A scale interface board 185 located within a central control unit receives the outputs of the six load cells, amplifies them, and, on command from the microcomputer 50, converts each one of the amplified outputs successively to a twelve-digit binary number which can be read by the computer. As in the case of each CPIB 180, 181 the microcomputer 50 reads the load cell outputs via standard memory read commands.

The microcomputer 50 and its adjuncts

The microcomputer 50 used in the system may be an Intel SDK-80 single board computer, preferably modified to meet the requirements of this particular use. The microcomputer 50 may have an 8080 microprocessor ($\mu P$) integrated circuit, 5120 words of read-only memory (ROM) for storing the data, and an Intel 8251 USART for communication with the CRT 51, the printer 52 and the cassette tape unit 53. By executing the instructions stored in its ROM, the microcomputer 50 controls the grading operation and then sends the data to the CRT terminal 50, the printer 52, and the cassette tape unit 53.

A Hazeltine 1500 CRT terminal may be used as the unit 51; it enables the graders to display the data collected for each load, causes the data to be printed (as by a Diablo 2300 matrix printer 52) onto the certificate, and transfers the data from the computer memory to the cassette tape unit 53. The cassette tape unit 53 stores the data on a standard digital cassette. These data can then be used to generate daily, weekly, monthly, and seasonal summaries. Each cassette will hold the data from approximately 2,000 loads. Once the data have been stored on the cassette, they can be erased from the computer memory so that a new load can use that space.

Operating procedure

The sequence of operations may be as follows: A truckload of tomatoes drives up to a grading platform. The incoming sample operator dials the load number for the display 136 for the truck into the switch register on the incoming sample control panel 130 and then presses the "ENTER LOAD NUMBER" pushbutton 142 with the weighing hopper empty. From this point on, let us assume that the load number is 55; therefore the operator dials 055 into the switch register and presses the "ENTER LOAD NUMBER" button 142. The microcomputer 50 checks to see that load number 055 is not already in use and then reserves space for it in its memory. The microcomputer 50 then takes a tare weight on the empty hopper 30 and lights the "WEIGH" and "#1" LED 170 on the grade-defect panel 131, and an "ENTER SHAPE" LED (not shown) on the peelability panel 132. (The tomatoes may be round or pear shaped.)

The sampler operator then uses the handle 75 to dump the first sample of fruit from the box 24 and the dumper 25 onto the table 27. Approximately half of the fruit falls on to the peelability and comminuted sample conveyor 22 and the remainder flows into the weighing hopper 30. The sampler operator presses the "WEIGH" pushbutton 145, the "WEIGH" LED 144 is extinguished, and the fruit is weighed. When weighing is complete, a buzzer sounds, the "WEIGH" LED 144 is lighted, and the "#2" LED on the group 147 is lighted. The sampler operator then pulls the dumping handle or cam 112, and the weighing hopper 30 is rotated about its axis allowing the fruit to slide onto the grade-defect conveyor 23. The operator then dumps a second sample onto the table and presses the "WEIGH" pushbutton 145. This procedure continues until all four samples have been weighed.

At the grading area, defective fruit is placed in buckets 41, 42, 43, 44, 45, and 46 and possibly 47 in accordance with grade-defects found, and when all four samples for the load have been graded, the grader presses one of the MOT (material other than tomatoes) buttons 171, 172 to signify that either dirt or extraneous material is the dominant MOT type. This causes the microcomputer 50 to record the MOT type and to take a tare on the bucket hook 49 with no buckets hanging. When the tare has been taken, the microcomputer 50 lights the "WEIGH" light 166 and also the light 161 in the first square of the bucket map. The grader will then hang the first defect bucket 41 on the hook 49 and press the "WEIGH" pushbutton 167. When the bucket 41 has been weighed, the "WEIGH" lamp 168 lights along with the lamp 162 in the second square of the bucket map. The grader removes the first bucket 41, hangs the second bucket 42, and presses the "WEIGH" pushbutton 167 again. This process continues for the remaining grade-defect buckets.

The fruit which is to be inspected for peelability is sorted, as is usual into three categories and an interchange like that just described takes place between the panel 132 and the microcomputer 50.

While the grade defect and peelability inspections are in progress, a portion of the sample is comminuted and tested for color and soluble solids. This can be a lengthy operation, particularly if it is necessary to re-deaerate the sample; therefore entry of the color and soluble solids data can be made independent of the other inspection operations. When the comminuted sample data is ready, the operator can dial the load number into the switch register on the color/souble solids control panel 133 and presses a pushbutton (not shown) to enter the load number. The microcomputer 50 verifies that the load number corresponds to a load which is awaiting color and/or soluble solids data, and a suitable interchange then takes place.

If two tables are used simultaneously, the procedure for each table is as just described.

When all of the required data has been entered into the microcomputer 50, the values are compared to the State limits, and the load number is added to one of the lists which are constantly displayed on the CRT screen; i.e., "LOADS READY FOR PRINTING" or "LOADS AWAITING REGRADE." If the load is ready for printing the load number will be followed by either a "P" or an "F" to indicate pass or fail. To display the data from one of these loads, the operator types "DISPLAY" (load no.) on the keyboard and data will appear on the screen 51. To print the data onto the certificate, the operator types "PRINT" (load no.) and the microcomputer gives the instruction "LOAD FORM AND PRESS SEL." The operator inserts the forms into the printer 52 in typewriter fashion and presses the SEL button on the printer chassis. The form is pulled through the printer 52 and filled out in approximately five seconds. The CRT 51 then displays "PRESS SEL" and the operator again prresses the "SEL" button to disable the printer 52. The microcomputer 50 then sends the data to the cassette tape unit 53, which takes about one second, and then the CRT 51 asks "DO YOU WISH TO REMOVE THIS LOAD FROM THE TABLE?". If the form was printed correctly and there is no further need for the data, the operator types "YES" and the load is removed. Otherwise, the operator types "NO" and the data is retained and can be displayed and/or printed as previously described. In either case the data is stored on the cassette for future use.

Test and Evaluation

The invention has been used in operation in 1980. Four samples of tomatoes were weighed from each of 1400 loads during the season. The system functioned well, both technically and mechanically.

A specific test evaluated the amount of protection provided by the shock protection device. For this, the microcomputer was programmed to record the peak loads sensed by the electronic load cell under normal operating conditions at the tomato inspection station. The probability of observing the actual peak load for each sample was made very high by taking 10,000 weights per second. As expected, the greatest amount of shock protection was obtained when the preload force was close to the weight of the full hopper. A decreased amount of shock protection was available as the spring preload is increased. Elasticity of the hopper support cable provided some protection for the extreme case of a rigid connection. A spring preload of ten percent over the maximum expected load appears to be suitable.

An extremely detailed evalutation of the system's accuracy was conducted in accordance with regulations from the California Department of Food and Agriculture, Division of Measurement Standards. The most critical test was the determination of rounding accuracy. Approval of prototype scales requires the ability to round to the next higher or lower division when a weight equal to 10% of a division is added to or subtracted from a weight at midpoint between the divisions. An example of this "break point" measurement is the requirement that scales with 100 g divisions must round to the next 100 g division when a weight between 40 g and 60 g is applied. This means that when adding 10 g increments, the reading must remain the same until a minimum of 40 g is applied, but must increase before exceeding 60 g. The break point measurement is repeated at various points over the range of the scale with both increasing and decreasing amounts of weight.

Certification of prototype scales requires the successful completion of a second break point test after a minimum of 60 days of operation. The scales are sealed against adjustments during the evaluation period to demonstrate capabilities of durability and consistency. Scales of this invention have received final approval by the State of California Bureau of Measurements Standards.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method of grading large batches of fruit by sampling technique, comprising the steps of:
    withdrawing a sample from the large batch of fruit,
    weighing at least a portion of said sample, inspecting the weighed fruit,
    placing grade-defect material into separately classified grade-defect buckets,
    weighing each grade-defect bucket one by one,
    determining the grade-defect percentages at the computer, and
    determining, at least in part, the acceptance and grade of the large batch according to those percentages.

2. A method of grading large batches of fruit by sampling technique, comprising the steps of:
    withdrawing a sample from the large batch of fruit,
    weighing at least a portion of said sample,
    indicating the batch number and weight to a computer,
    inspecting the weighed fruit,
    placing grade-defect material into separately classified grade-defect buckets, one for each type of grade-defect,
    weighing each grade-defect bucket one by one,
    indicating the weight and defect for each grade-defect to the computer,
    determining by the computer the grade-defect percentages by weight, and
    determining whether to accept, or reject, and the grade of the batch according to those percentages.

3. A method of grading large batches of fruit by sampling technique, comprising the steps of:
    withdrawing a sample from the large batch of fruit,
    dividing the sample into two approximately equal portions, inspecting without weighing one said portion for certain exhibited characteristics,
    indicating to a computer the conclusions from this inspecting,
    weighing the other half of the sample,
    indicating the weight to the computer,
    inspecting the weighed fruit,
    placing grade-defect material therefrom into separately clssified grade-defect buckets,
    weighing each grade-defect one by one,
    indicating the weight and defect for each grade-defect to the computer,
    determining the grade-defect percentages at the computer,
    displaying the various defect percentages by weight, and
    determining whether to accept, or reject, and determining the grade of the batch according to the computer data.

4. A method of grading large batches of fruit by sampling technique, comprising the steps of:
    withdrawing a sample from the large batch of fruit,
    placing the fruit in a flanged sample box,
    inserting the flanged box into a dumping frame,
    dumping the flanged box so that half of it goes into a scale-supported weigh hopper and half elsewhere for other uses,
    weighing the fruit in the weigh hopper,
    indicating the batch number and weight to a computer,
    transferring the fruit from the weigh hopper to an inspection path,
    inspecting the fruit in said path and placing grade-defect material into separately classified grade-defect buckets,
    after all fruit from the weigh hopper has been inspected, weighing each grade-defect bucket one by one and indicating the weight to the computer,
    determining the grade defect-percentages by weight at the computer,
    displaying the various defect percentages by weight,
    determining from the display whether to accept, reject, or take another check sample, and
    then indicating the final choice and grade of the fruit for decision as to whether and how to process it.

5. A method of grading large batches of fruit by sampling technique, comprising the steps of:
    withdrawing a sample from the large batch of fruit,
    placing the fruit in a flanged bin,
    inserting the flanged box into a dumping frame,
    dumping the flanged box so that half of its contents goes into a scale-supported weigh hopper and half into a first conveyor,
    handling the material in the first conveyor for suitable scrutiny and sending conclusions therefrom to a computer,
    weighing the fruit in the weigh hopper,
    indicating the batch number and weight to the computer,
    transferring the fruit from the weigh hopper to a second conveyor,
    splitting the path of the fruit in the second conveyor into two sorting conveyor paths,
    inspecting the fruit in each path and placing grade-defect material into separately classified grade-defect buckets,
    after all fruit from the weigh hopper has been inspected, weighing each grade-defect bucket one by one and indicating the weight to the computer,
    determining the grade-defect percentages at the computer,
    displaying the various defect percentages by weight,
    determining from the display whether to accept, reject, or take another check sample according to the displayed percentages, and then recording the final choice and grade of the fruit and deciding whether and how to process it.

6. A tomato grading method, comprising:
drawing incoming samples of tomatoes from trucks,
weighing accurately a selected portion of each incoming sample for defect grading,
inspecting the weighed portion for grade-defects,
separating the defective portions into a series grade-defects,
weighing each of the various grade-defects, and
computing the percentage of each grade-defect based on the incoming sample weight.

7. A tomato grading method, comprising:
dividing into two substantially equal parts incoming samples of tomatoes that have been drawn from trucks,
weighing accurately one of the halves of the divided incoming samples for defect grading,
inspecting the weighed half for grade-defects,
segregating the grade-defect material by weight,
weighing each of segregated grade-defect material, and
determining the percentage of each grade-defect based on the incoming sample weight.

8. A weighing machine for a fruit sampler including in combination:
a main frame,
a piano wire suspension attached to a top portion of the main frame,
a housing suspended from the piano wire,
a shock transmission member,
a shock-absorbing spring between said shock transmission member and said housing and compressed by shock exerted on said shock transmission member,
a load cell suspended from said shock transmission member,
a weigh hopper suspended from the load cell by a pair of wires, one at each side of the weigh hopper, and
transfer means for releasing the contents from the weigh hopper.

9. The machine of claim 8 having a turnbuckle on each of said pair of wires for adjusting the suspension of the weigh hopper from the load cell.

10. The machine of claim 8 having dampening means between said weigh hopper and said main frame for preventing excessive motion of the weigh hopper relative to the frame while transmitting no weight from the weigh hopper to the frame.

11. The machine of claim 10 wherein said suspension and said dampening means comprises:
a pair of stub axles extending out from said weigh hopper,
a pair of suspension bars, each having a bearing hole therethrough for supporting a said axle and having an upper end connected to a said wire,
low friction means surrounding each said axle,
a pair of brackets on said main frame having an oversize elongated vertical slot therethrough, said axle extending therethrough and movable therein for a limited amount, and
a low friction end member on said axle for retaining the axle in said oversize slots.

12. The machine of claim 8 wherein said transfer means comprises a cable attached to the center of the upper edge one one end of the weigh hopper and passing around the bottom of the weigh hopper, said bottom being a circular cylindrical segment, and to a cam device, said cam device having means providing for smooth inversion of the weigh hopper and for automatically providing a dwell period therefor at the full inversion point thereof.

13. The machine of claim 8 having input means comprising:
a dumper pivotally secured to said main frame for inversion thereof, half over said weigh hopper and half to one side thereof,
said dumper having a pair of channeled guides for receiving flanged side edges of a conventional sample box and supporting the box thereby,
a vertexed divider centrally located on said dumper and extending aft from a forward edge and comprising a V-shaped bar, for guiding the contents of said box, upon inversion of said dumper while carrying said box, so that half of the contents drop on one side of said V-shaped bar and half on the other side, and
means for inverting said dumper.

14. The machine of claim 8 wherein said main frame is mounted on vibration dampening means for reducing the effects of externally induced vibrations on said main frame.

15. The machine of claim 14 wherein said vibration dampening means comprises:
a support member below said main frame,
said main frame having a series of vertical legs, each leg having a pair of brackets secured thereto,
a first said bracket having a horizontal portion with an oversize opening therethrough,
a guide and limit stop and overload protector member extending through said bracket, being substantially smaller in diameter than said oversize opening and being rigidly secured therebelow to said support member,
a second said bracket having a horizontal portion, and
a resilient bumper between said horizontal portion of said second bracket and said support member to provide support for said main frame.

16. A weighing machine for a fruit sampler including in combination:
a main frame,
vibration dampening means supporting said main frame,
a piano wire suspended from an upper portion of the main frame,
a housing suspended from the piano wire,
a shock-absorbing spring having a lower end resting on a portion of said housing,
a shock transmission member resting on the upper end of said spring and extending down through said spring and said housing,
a load cell suspended from said shock transmission member,
a weigh hopper comprising a circular cylindrical segment with side walls, suspended from the load cell by a pair of wires, one at each side of the weigh hopper,
a turnbuckle on each said wire for adjusting the suspension of the weigh hopper from the load cell,
dampening means between said weigh hopper and said main frame for preventing excessive motion of the weigh hopper relative to the main frame while transmitting no weight from the weigh hopper to the main frame, transfer means for transferring the contents of the weigh hopper gently onto a conveyor, said transfer means comprising a cable attached to the center of the upper edge on one end of the weigh hopper and passing around the circular bottom of the weigh hopper and to a cam device, said cam device having means providing for smooth inversion of the weigh hopper and for automatically providing a dwell period therefor at the full inversion point thereof.

17. A grading table for a fruit sampler, including in combination:

a longitudinally extending main frame having an input end, vibration dampening means supporting said main frame, first and second parallel conveyors extending longitudinally along and supported by said main frame, a dumper supported by said main frame at said input end for rotation of about 180° and having means for holding a sample box, dumping means for inverting said dumper over said two conveyors, dividing means for dividing the contents of a said sample box when said dumper is inverted so that approximately equal portions fall down toward said first and second conveyors, a piano wire suspension attached to a top portion of the main frame, a housing suspended from the piano wire, a shock transmission member, a shock-absorbing spring between said shock transmission member and said housing and compressed between them as force is applied to said shock transmission member, a first load cell suspended from said shock transmission member, a weigh hopper over said first conveyor for receiving half of the material dumped from said dumper, said weigh hopper being suspended from said first load cell by a pair of wires, one at each side of the weigh hopper, a turnbuckle on each said wire for adjusting the suspension of the weigh hopper from the load cell, dampening means between said weigh hopper and said frame for preventing excessive motion of the weigh hopper relative to the frame while transmitting no weight from the weigh hopper to the frame, transfer means for releasing the contents of the weigh hopper gently onto said first conveyor, output means for said second conveyor leading the fruit deposited on said second conveyor to an inspection station, a defect grading station, convey means for conducting fruit from said first conveyor to said defect grading station, a series of grade-defect buckets at said defect grading station, for segregation by defect of the defective material in the weighed portion of said sample, a second load cell supported by said main frame at said grade defect station having a hook depending therefrom by which each said bucket may be suspended for separate weighing, said second load cell having a frame, shock transmission member, and shock-absorbing spring like those of said first load cell, and comparison means for comparing the weights weighed by said first load cell with those weighed by said second load cell.

18. The grading table of claim 17 wherein said transfer means comprises a cable attached to the center of the upper edge on one end of the weigh hopper and passing around the bottom of the weigh hopper and to a cam device, said cam device having means providing for smooth inversion of the weigh hopper and automatically providing a dwell period therefor at the full inversion point thereof.

19. The grading table of claim 17 having two conveyors moving past said defect grading station, one on each side thereof with the grade-defect buckets in between them, and means for dividing the flow of fruit from said first conveyor so that approximately equal amounts go to each of said two conveyors.

20. A grading table for a fruit sampler, including in combination:

a longitudinally extending main frame having an input end, first and second parallel conveyors extending longitudinally along and supported by said main frame, a dumper supported by said main frame at said input end for rotation of about 180° and having means for holding a sample box, dumping means for inverting said dumper over said two conveyors, dividing means for dividing the contents of a said sample box when said dumper is inverted so that approximately equal portions fall down toward said first and second conveyors, a weigh hopper over said first conveyor for receiving half of the material dumped from said dumper, a first load cell suspended from said frame and supporting said weigh hopper, shock protection means for said first load cell, dampening means between said weigh hopper and said frame for preventing excessive motion of the weigh hopper relative to the frame while transmitting no weight from the weigh hopper to the frame, first control panel means supported by said main frame adjacent said first load cell for indicating to an operator a series of steps to take and the sequence to take them in at that location, for indicating the weights weighed by said fruit load cell, and to receive confirmation from the operator, transfer means for releasing the contents of the weigh hopper gently onto said first conveyor, output means for said second conveyor for conveying the sample portions dumped on said second conveyor to an inspection station, second control panel means at said inspection station for indicating to an operator the steps to take there and their sequence and to receive data from that operator, a defect grading station, conveying means for conducting fruit from said first conveyor to said defect grading station, a series of grade-defect buckets at said defect grading station, for segregation by defect the defective material in the weighed portion of said sample, a second load cell supported by said main frame at said grade-defect station having a hook depending therefrom by which each said bucket may be suspended for separate weighing, shock protection means for said second load cell, third control panel means at said grade-defect station for indicating to operators there the steps to take there and their sequence and to receive data from those operators, a programmed microcomputer, first interface means for connecting each said control panel means to said microcomputer for communication therebetween, second interface means connecting each said load cell to said microcomputer for communication therebetween, display means connected to and driven by said microcomputer, and printing means connected to and driven by said microcomputer.

21. The grading table of claim 20 having a cassette tape unit connected to and driven by said microcomputer.

* * * * *